(12) United States Patent
Uchino et al.

(10) Patent No.: US 10,401,925 B2
(45) Date of Patent: Sep. 3, 2019

(54) PORTABLE INFORMATION APPARATUS

(71) Applicant: LENOVO (SINGAPORE) PTE. LTD., Singapore (SG)

(72) Inventors: Akinori Uchino, Kanagawa-ken (JP); Hiroaki Agata, Kanagawa-ken (JP); Takuroh Kamimura, Kanagawa-ken (JP); Tomoaki Kosugi, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 127 days.

(21) Appl. No.: 15/365,277

(22) Filed: Nov. 30, 2016

(65) Prior Publication Data

US 2017/0153678 A1     Jun. 1, 2017

(30) Foreign Application Priority Data

Nov. 30, 2015  (JP) .................................. 2015-232784

(51) Int. Cl.
  *G06F 1/20*   (2006.01)
  *G06F 1/16*   (2006.01)
(52) U.S. Cl.
  CPC ............ *G06F 1/203* (2013.01); *G06F 1/1632* (2013.01); *G06F 2200/201* (2013.01)
(58) Field of Classification Search
  CPC ....................................................... G06F 1/203
  See application file for complete search history.

(56) References Cited

U.S. PATENT DOCUMENTS

| | | | | |
|---|---|---|---|---|
| 5,768,101 A | * | 6/1998 | Cheng ................... | G06F 1/1632 361/679.41 |
| 5,974,556 A | * | 10/1999 | Jackson .................. | G06F 1/203 713/322 |
| 6,094,347 A | * | 7/2000 | Bhatia ..................... | G06F 1/203 165/104.33 |

(Continued)

FOREIGN PATENT DOCUMENTS

| | | |
|---|---|---|
| JP | 05-073174 | 3/1993 |
| JP | 2000172378 A | 6/2000 |

(Continued)

*Primary Examiner* — David M Sinclair
*Assistant Examiner* — Robert D Brown
(74) *Attorney, Agent, or Firm* — Antony P. Ng; Russell Ng PLLC

(57) ABSTRACT

An electronic apparatus having a cooling device that can reduce size and cost thereof while maintaining sufficient cooling performance of cooling a portable information apparatus is disclosed. The electronic apparatus includes a portable information apparatus and a cooling device. The portable information apparatus includes a heat-dissipation heat sink thermally connected to a heating body. The cooling device includes a cooling unit for absorbing heat from the heating body. The cooling unit includes a heat-receiving heat sink that is thermally connected to a heat-dissipation heat sink when the portable information apparatus is connected to the cooling device, and a radiator that dissipates heat absorbed in the heat-receiving heat sink to outside. The radiator is disposed on an exhaust path from an air outlet of the portable information apparatus while the portable information apparatus is connected to the cooling device.

5 Claims, 6 Drawing Sheets

(56) References Cited

U.S. PATENT DOCUMENTS

| | | | | |
|---|---|---|---|---|
| 6,109,039 | A * | 8/2000 | Hougham | G06F 1/203 62/259.2 |
| 6,266,243 | B1 * | 7/2001 | Tomioka | G06F 1/1632 165/104.33 |
| 6,434,001 | B1 * | 8/2002 | Bhatia | G06F 1/1632 165/104.14 |
| 6,453,378 | B1 * | 9/2002 | Olson | G06F 1/1632 361/679.41 |
| 6,646,874 | B2 * | 11/2003 | Pokharna | G06F 1/1632 361/679.09 |
| 7,974,090 | B2 * | 7/2011 | Risher-Kelly | G06F 1/1632 165/185 |
| 8,000,099 | B2 * | 8/2011 | Parker | G06F 1/1632 174/16.1 |
| 8,270,168 | B2 * | 9/2012 | Lin | G06F 1/1632 165/185 |
| 8,405,975 | B2 * | 3/2013 | Helberg | G06F 1/1632 361/679.47 |
| 8,553,409 | B2 * | 10/2013 | Rehmann | G06F 1/1632 361/679.47 |
| 8,619,419 | B2 * | 12/2013 | Zimmermann | G06F 1/203 361/679.41 |
| 2002/0105783 | A1 * | 8/2002 | Kitahara | G06F 1/1632 361/695 |
| 2003/0039097 | A1 * | 2/2003 | Igarashi | G06F 1/203 361/679.21 |
| 2003/0214786 | A1 * | 11/2003 | Niwatsukino | G06F 1/203 361/699 |
| 2004/0027798 | A1 * | 2/2004 | Fujiwara | G06F 1/1632 361/679.48 |
| 2006/0277923 | A1 * | 12/2006 | Lee | F25B 21/02 62/3.2 |
| 2009/0077296 | A1 * | 3/2009 | Mok | G06F 1/1632 710/304 |
| 2010/0079940 | A1 * | 4/2010 | Mongia | G06F 1/20 361/679.49 |
| 2011/0110043 | A1 * | 5/2011 | Iijima | G06F 1/20 361/701 |
| 2013/0301213 | A1 * | 11/2013 | Senyk | G06F 1/203 361/679.47 |
| 2014/0365701 | A1 * | 12/2014 | Naruse | G06F 1/1632 710/304 |
| 2015/0327400 | A1 * | 11/2015 | Wang | H05K 7/20272 361/696 |
| 2017/0273214 | A1 * | 9/2017 | Casparian | G06F 1/203 |

FOREIGN PATENT DOCUMENTS

| | | |
|---|---|---|
| JP | 2000216558 A | 8/2000 |
| JP | 2000349481 A | 12/2000 |
| JP | 202158476 A | 5/2002 |
| JP | 2002366259 A | 12/2002 |
| JP | 2003067087 A | 3/2003 |
| JP | 2011-103102 A | 5/2011 |

* cited by examiner

PORTABLE INFORMATION APPARATUS

PRIORITY CLAIM

The present application claims benefit of priority under 35 U.S.C. §§ 120, 365 to the previously filed Japanese Patent Application No. JP2015-232784 with a priority date of Nov. 30, 2015, which is incorporated by reference herein.

TECHNICAL FIELD

The present invention relates to portable information apparatuses in general, and in particular to a portable information apparatus having a cooling device for cooling the portable information apparatus.

BACKGROUND

A portable information apparatus having a lightweight and compact design in consideration of portability often has limited functions. For example, a notebook personal computer (laptop PC) typically has limited functions in order to reduce the weight. Thus, there are limitations in increasing the size and performance of a cooling function of reducing heating from a processor or other devices mounted on a laptop PC and serving as an internal heating body of the laptop PC. In view of this, a cooling device detachably coupled to a laptop PC is utilized to support the cooling function of the laptop PC.

For example, a cooling device having a heat pipe thermally connected to a heating body of a laptop PC can be mounted on a mount surface and a cooling unit is utilize to transfer heat absorbed in the heat pipe to a radiator and to dissipate the heat with an air supply fan.

A laptop PC needs to have predetermined cooling performance even when used without being connected to a cooling device. Thus, a typical laptop PC generally includes within an apparatus chassis, a radiator fin for dissipating heat from a heating body outward and an air supply fan for supplying air to the radiator fin. When such a laptop PC is connected to a cooling device, although an air supply fan is provided in the laptop PC, another air supply fan is provided in a cooling device so that the cost and size of the entire device increase and the configuration of the device becomes complicated.

In addition, a cooling device as described above needs to have enhanced functions such as a computing function, a power supply function, and an extension function, as well as an enhanced cooling function for cooling a laptop PC. Thus, a cooling unit mounted on the cooling device preferably reduces the number and sizes of components thereof.

Consequently, it would be desirable to provide an improved cooling device for cooling a portable information device such as a laptop PC.

SUMMARY

In accordance with an embodiment of the present disclosure, a portable information apparatus includes a cooling device and an apparatus chassis containing a heating body and an air supply fan configured to release heat generated in the heating body to outside the apparatus chassis through an air outlet provided in an outer wall surface of the apparatus chassis. The cooling device, which includes a cooling unit for absorbing heat of the heating body, is configured to be detachably connected to the portable information apparatus. The portable information apparatus also includes a heat-dissipation heat sink thermally connected to the heating body. The cooling unit includes a heat-receiving heat sink configured to be thermally connected to the heat-dissipation heat sink when the portable information apparatus is connected to the cooling device, and a radiator that dissipates heat absorbed in the heat-receiving heat sink to outside. The radiator is disposed on an exhaust path from an air outlet of the portable information apparatus while the portable information apparatus is connected to the cooling device.

The radiator in the cooling device is disposed on the exhaust path from the air outlet of the portable information apparatus while the portable information apparatus is connected to the cooling device. This configuration enables air to be supplied to the radiator to cool the radiator in the cooling device using the air supply fan mounted in the portable information apparatus. Thus, an air supply fan for supplying air to the radiator does not need to be provided within the cooling device. Accordingly, it is possible to reduce the sizes and costs of the cooling device and the electronic apparatus including the cooling device, while maintaining sufficient cooling performance for cooling the portable information apparatus.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
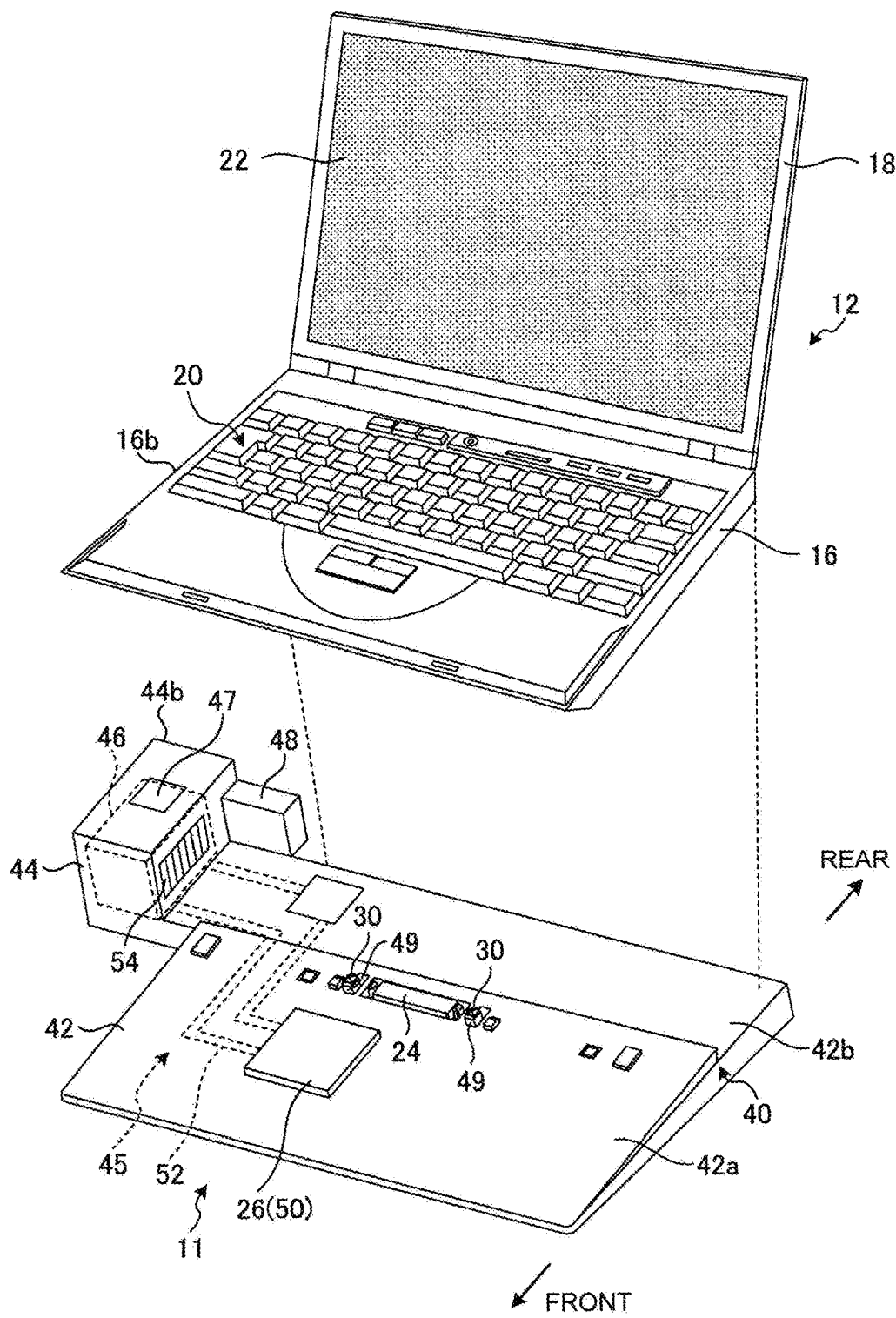
FIG. 1 is a perspective view of an electronic apparatus according to an embodiment of the present invention.
Figure 2:
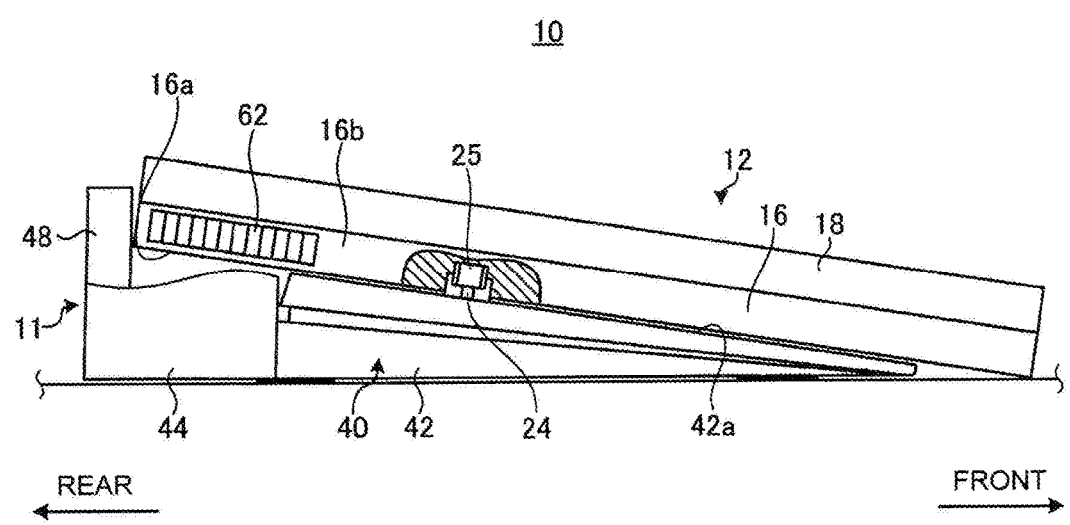
FIG. 2 is a cross-sectional side view of a state in which the cooling device and a portable information apparatus from FIG. 1 are connected to each other.
Figure 3:
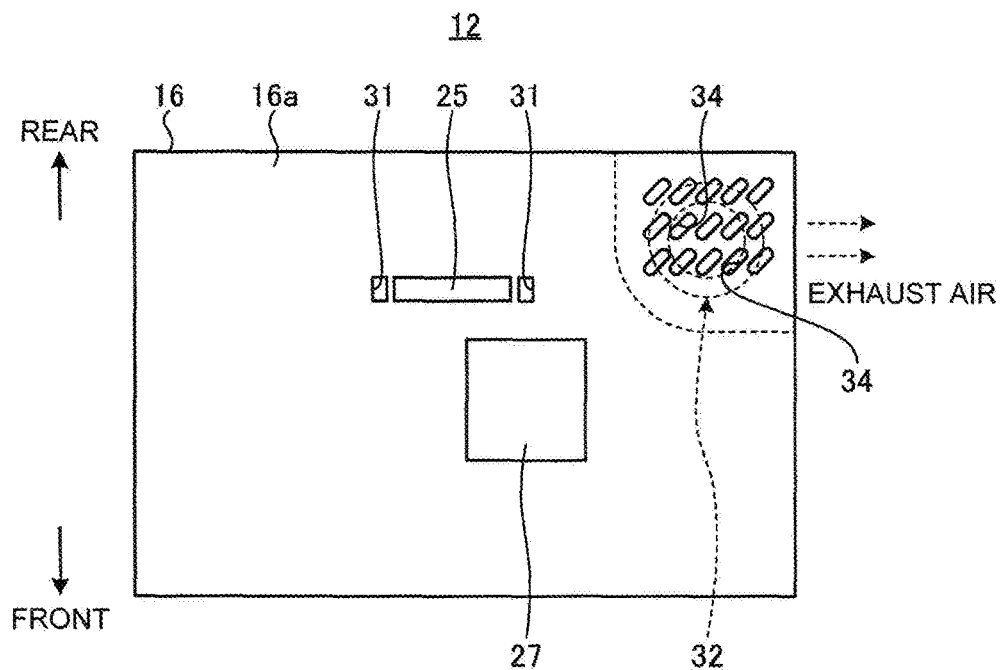
FIG. 3 is a bottom view of the portable information apparatus.
Figure 4:
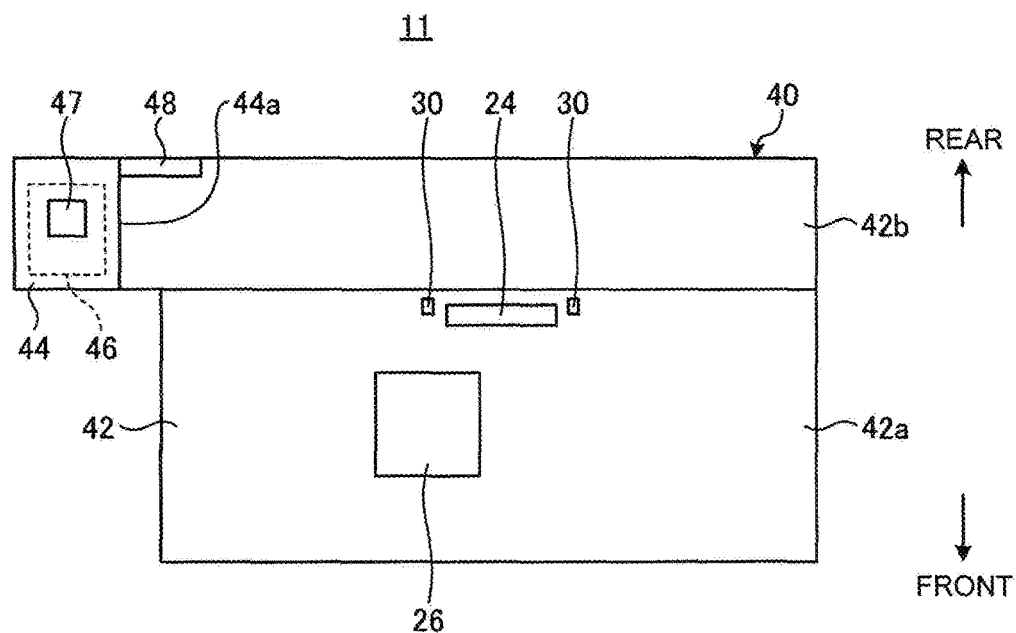
FIG. 4 is a top view of the cooling device.

FIG. 1 is a perspective view of an electronic apparatus 10 according to an embodiment of the present invention in which a cooling device 11 and a portable information apparatus 12 are separated from each other. FIG. 2 is a cross-sectional side view of a state in which the cooling device 11 and the portable information apparatus 12 illustrated in FIG. 1 are connected to each other. FIG. 3 is a bottom view of the portable information apparatus 12. FIG. 4 is a top view of the cooling device 11.

In the electronic apparatus 10 according to this embodiment, the portable information apparatus 12 that is a laptop PC is mounted on and connected to the cooling device 11 that is an extension device so that the cooling function of the portable information apparatus 12 can be enhanced and a processing function, a power supply function, and a connection function with respect to peripheral equipment and a network can be extended and enhanced. The portable information apparatus 12 may be, of course, a device except a laptop PC, and may be, for example, a tablet personal computer (tablet PC) or a smartphone each having no physical keyboard.

First, an electronic apparatus 10 will be described. As illustrated in FIG. 1, the portable information apparatus 12 is of a clamshell type in which a display chassis 18 is coupled to a portable information apparatus chassis 16 to be freely opened and closed. A keyboard 20 is disposed on the top surface of the portable information apparatus chassis 16, and a display 22 is provided on the front surface of the display chassis 18.

As illustrated in FIGS. 2-3, a bottom surface 16a of the portable information apparatus chassis 16 includes an apparatus connector 25 electrically connected to an extension connector 24 of the cooling device 11 and a heat-dissipation heat sink 27 thermally connected to a heat-receiving heat sink 26 of the cooling device 11. The bottom surface 16a has an engaging hole 31 with which an engaging lever 30 projecting from the cooling device 11 is engaged. A set of outdoor-air intake vents 34 for allowing the air supply fan 32 in the portable information apparatus chassis 16 to take the outdoor air are provided near a corner of the bottom surface 16a.

Figure 5:
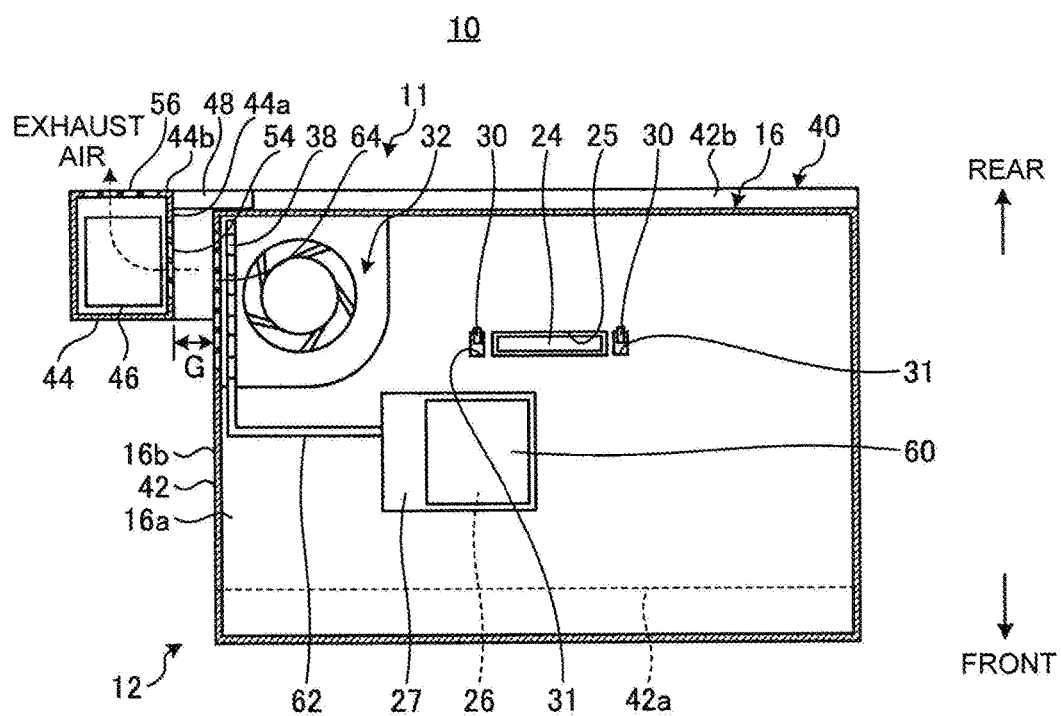
FIG. 5 is a cross-sectional plan view illustrating a state in which the portable information apparatus is mounted on and connected to the cooling device.
Figure 6:
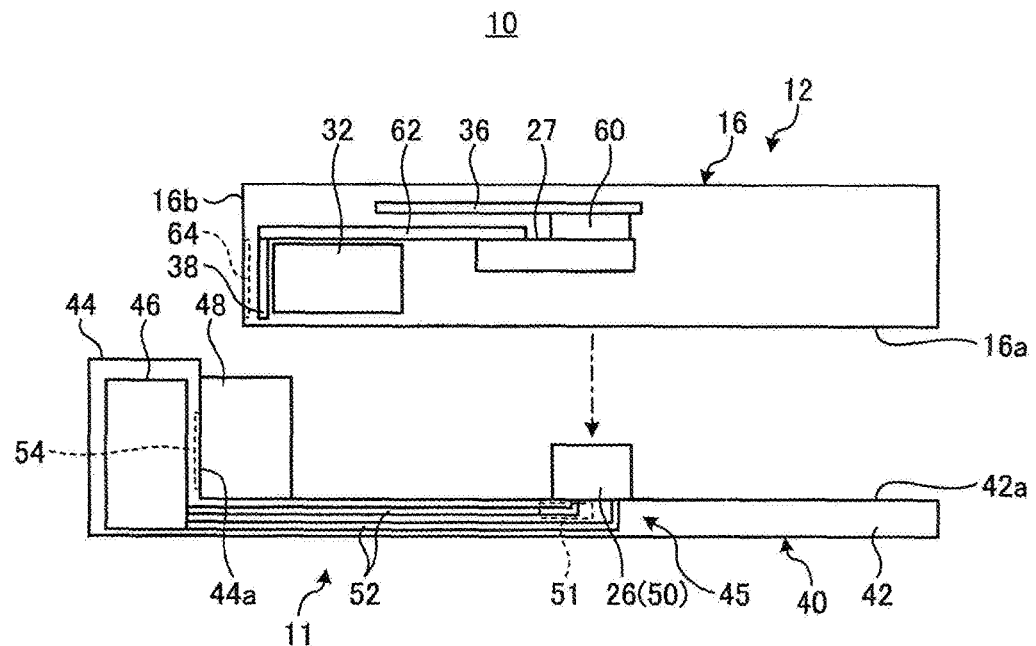
FIG. 6 is a side view illustrating an internal configuration of each of the cooling device and the portable information apparatus that are separated from each other.

The apparatus connector 25 is connected to a board 36 (see FIG. 6) housed in the portable information apparatus chassis 16 of the portable information apparatus 12. In FIG. 6, the apparatus connector 25 is not shown. The heat-dissipation heat sink 27 is disposed in the portable information apparatus chassis 16, exposed from the bottom surface 16a, and contacts the heat-receiving heat sink 26 of the cooling device 11 to thereby extend the cooling function of the portable information apparatus 12. Since the heat-dissipation heat sink 27 and the heat-receiving heat sink 26 are thermally connected to each other, heat generated in the portable information apparatus 12 is transferred to the cooling device 11 and is dissipated outward. The air supply fan 32 is configured to take outdoor air from the outdoor-air intake vents 34 in the bottom surface 16a and supply air to radiator fins 38 (see FIG. 5) described later.

As illustrated in FIGS. 1-2, the cooling device 11 is used with the portable information apparatus chassis 16 of the portable information apparatus 12 mounted on the cooling device 11, and includes a device chassis 40 formed by using of a synthetic resin material and provided with a PC mount part 42 and a radiator housing 44.

The PC mount part 42 has a box shape having a top surface that is large enough to allow the portable information apparatus 12 to be mounted on the top surface. The PC mount part 42 is tilted to have its height gradually increase from the front to the rear, and includes a mount surface 42a on which the bottom surface 16a of the portable information apparatus 12 is placed and a refuge surface 42b that is recessed at the rear of the mount surface 42a. The refuge surface 42b is a lower portion for avoiding an unillustrated battery or another object that possibly projects from a rear lower surface of the portable information apparatus 12.

The radiator housing 44 is a box having a rectangular solid shape whose height is larger than that of the PC mount part 42, and is disposed at a side and the rear of the PC mount part 42 (at a side of the refuge surface 42b). A radiator 46 of a cooling unit 45 described later is housed in the radiator housing 44. An ejecting button 47 is provided on the upper surface of the radiator housing 44. The ejecting button 47 is an operating button that is operated when the portable information apparatus 12 mounted on and connected to the cooling device 11 is detached. A positioning member 48 projecting from the refuge surface 42b is provided on a rear portion of a side surface of the radiator housing 44 facing the refuge surface 42b. The positioning member 48 is a member for positioning a rear end surface of the portable information apparatus 12 in mounting the portable information apparatus 12 on the PC mount part 42.

The extension connector 24 is provided on the mount surface 42a. The extension connector 24 is connected to an unillustrated board housed in the PC mount part 42, and projects from the mount surface 42a. The extension connector 24 constitutes a connection terminal of each extension function provided in the cooling device 11, and is connected to the apparatus connector 25 provided on the bottom surface 16a of the portable information apparatus 12. Connection of the apparatus connector 25 to the extension connector 24 electrically connects the cooling device 11 and the portable information apparatus 12 so that the extension functions provided in the cooling device 11 can be used by using the portable information apparatus 12.

The engaging lever 30 projects from each of the left and right sides of the extension connector 24, and has its top exposed at the mount surface 42a. A guide post 49 having a U shape in plan projects to surround three sides: front, left, and right, of each engaging lever 30. The guide post 49 serves as a positioning pin for positioning the portable information apparatus 12 relative to the device chassis 40 by inserting the guide post 49 together with the engaging lever 30 into the engaging hole 31 of the portable information apparatus 12 to connect the portable information apparatus 12 to the cooling device 11.

Figure 7:
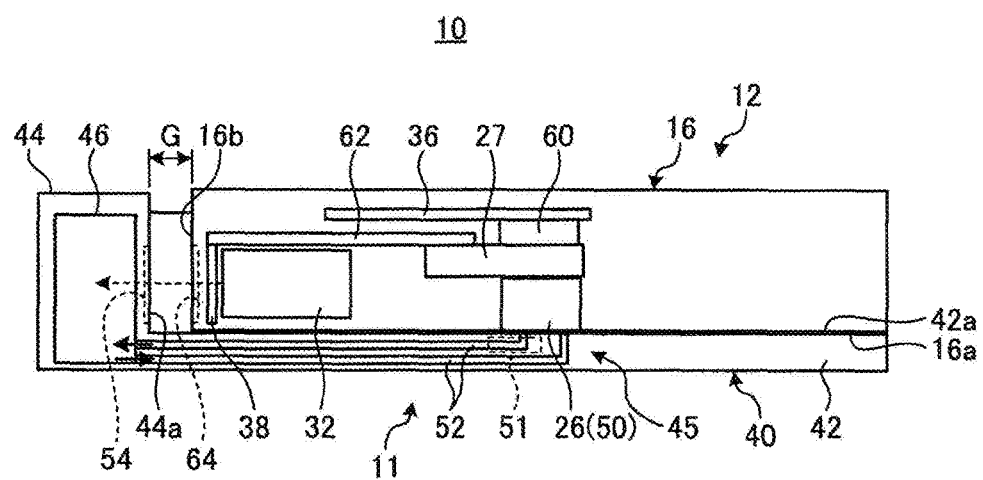
FIG. 7 is a side view illustrating a state in which the cooling device and the portable information apparatus illustrated in FIG. 6 are connected to each other.

A cooling structure of the electronic apparatus 10 will now be described. FIG. 5 is a cross-sectional plan view of a state in which the portable information apparatus 12 is mounted on and connected to the cooling device 11. FIG. 6 is a side view of the cooling device 11 and the portable information apparatus 12 that are separated from each other. FIG. 7 is a side view of a state in which the cooling device 11 and the portable information apparatus 12 illustrated in FIG. 6 are connected to each other.

As illustrated in FIGS. 1 and 6, the cooling device 11 includes a cooling unit (water cooling unit) 45 in which the radiator 46, a water cooling jacket 50, and a circulating pump 51 are connected to one another in a loop by pipes 52 so that cooling water circulates. The water cooling jacket 50 is integrated with the heat-receiving heat sink 26. In other words, the water cooling jacket 50 is used as the heat-receiving heat sink 26. In the cooling unit 45 having such a configuration, cooling water from which heat has been dissipated in the radiator 46 is introduced into the water cooling jacket 50. The cooling water that has collected heat of the heat-receiving heat sink 26 in the water cooling jacket 50 is introduced into the radiator 46 again through the circulating pump 51. In this manner, the heat-receiving heat sink 26 can be cooled with a high cooling efficiency.

Each of the heat-receiving heat sink 26 and the water cooling jacket 50 is a rectangular plate member made of a metal material having a high thermal conductivity, such as copper or aluminum. Cooling water is supplied from the radiator 46 to the inside of the water cooling jacket 50 through the pipes 52. This cooling water is released to the pipes 52 to the circulating pump 51.

As illustrated in FIGS. 1 and 5, the radiator housing 44 housing the radiator 46 has an air inlet 54 in a side surface (outer wall surface) 44a facing the PC mount part 42, and also has a device air outlet 56 in a back surface 44b facing rearward. Outdoor air taken in the radiator housing 44 through the air inlet 54 passes through gaps among unillustrated fins to cool cooling water circulating in the radiator 46, and then, is released from the device air outlet 56 to the outside (see FIG. 5).

As illustrated in FIGS. 5 and 6, a heating body 60 attached to the board 36, the heat-dissipation heat sink 27, a heat pipe 62, the radiator fins 38, and the air supply fan 32 are provided in the portable information apparatus chassis 16 of the portable information apparatus 12. The bottom surface 16a of the portable information apparatus chassis 16 has the outdoor-air intake vents 34 serving as outdoor inlets to the air supply fan 32. A side surface (outer wall surface) 16b of the portable information apparatus chassis 16 has an air outlet 64 serving as an outdoor air outlet for air from the air supply fan 32.

The heat-dissipation heat sink 27 is a rectangular plate member made of a metal material having a high thermal conductivity, such as copper or aluminum. As illustrated in FIG. 6, the heat-dissipation heat sink 27 is thermally connected to the heating body 60 that is an electronic component, such as CPU or a GPU, provided in the portable information apparatus chassis 16. With this configuration, heat generated in the heating body 60 is efficiently transferred to the heat-dissipation heat sink 27.

The heat pipe 62 has an end thermally connected to the heat-dissipation heat sink 27 and the other end thermally connected to the radiator fins 38. The heat pipe 62 is a heat transfer member that transfers, to the radiator fins 38, heat transferred from the heating body 60 to the heat-dissipation heat sink 27.

The radiator fins 38 are made of a metal material having a high thermal conductivity, such as copper or aluminum. The radiator fins 38 are disposed between the inner surface of the air outlet 64 formed in the side surface 16b of the portable information apparatus chassis 16 and the outlet of the air supply fan 32. Outdoor air sucked from the outdoor-air intake vents 34 into the air supply fan 32 passes through gaps between the radiator fins 38 to cool the radiator fins 38, and then, is released from the air outlet 64.

Thus, in attaching the portable information apparatus 12 to the cooling device 11, the extension connector 24 and the apparatus connector 25 are connected to each other while the engaging levers 30 and the guide posts 49 are inserted into the engaging holes 31 in the bottom surface 16a of the portable information apparatus 12 with the rear end surface of the portable information apparatus 12 positioned with the positioning member 48. In this manner, the extension connector 24 and the apparatus connector 25 are electrically connected to each other, and the engaging levers 30 are engaged with the engaging holes 31 so that detachment of the portable information apparatus 12 from the cooling device 11 is inhibited (see FIG. 5).

When the portable information apparatus 12 is attached to the cooling device 11 in the manner described above, a surface of the heat-receiving heat sink 26 (water cooling jacket 50) facing the cooling device 11 comes into contact with the a surface of the heat-dissipation heat sink 27 facing the portable information apparatus 12, as illustrated in FIG. 7. In addition, as illustrated in FIGS. 5 and 7, the air outlet 64 of the portable information apparatus 12 and the air inlet 54 of the radiator housing 44 of the cooling device 11 are opposed to each other with a gap G interposed therebetween. That is, the air inlet 54 of the radiator housing 44 of the cooling device 11 is disposed on an exhaust path from the air outlet 64 by the air supply fan 32 of the portable information apparatus 12, and the radiator 46 is also disposed on this exhaust path accordingly.

Consequently, heat generated in the heating body 60 in the portable information apparatus 12 is transferred from the heat-dissipation heat sink 27 to the heat-receiving heat sink 26, and collected by cooling water flowing in the water cooling jacket 50, and then supplied to the radiator 46. Since exhaust air from the exhaust air supply fan 32 that has cooled the radiator fins 38 is supplied to the radiator 46, cooling water flowing in the radiator 46 is cooled. At this time, a part of heat generated in the heating body 60 is transferred from the heat-dissipation heat sink 27 to the radiator fins 38 through the heat pipe 62, and this air supply from the air supply fan 32 to the radiator fins 38 dissipates heat to the outside. Of course, in a case where the portable information apparatus 12 is not attached to the cooling device 11 and is used alone, heat generated in the heating body 60 can be dissipated from the radiator fins 38 to the outside.

As described above, the electronic apparatus 10 according to the present embodiment includes a portable information apparatus 12 having an apparatus chassis 16 housing a heating body 60 and an air supply fan 32 disposed in the apparatus chassis 16 and configured to release heat generated in the heating body 60 to outside the apparatus chassis 16 through an air outlet 64 provided in a side surface 16b that is an outer wall surface of the apparatus chassis 16; and a cooling device 11 including a cooling unit 45 for absorbing heat of the heating body 60 and configured to be detachably connected to the portable information apparatus 12. The portable information apparatus 12 includes a heat-dissipation heat sink 27 thermally connected to the heating body 60. The cooling unit 45 includes a heat-receiving heat sink 26 configured to be thermally connected to the heat-dissipation heat sink 27 when the portable information apparatus 12 is connected to the cooling device 11, and a radiator 46 that dissipates heat absorbed in the heat-receiving heat sink 26 to outside. The radiator 46 is disposed on an exhaust path from an air outlet 64 of the portable information apparatus 12 while the portable information apparatus 12 is connected to the cooling device 11.

As described above, in the electronic apparatus 10, while the portable information apparatus 12 is connected to the cooling device 11, the radiator 46 is disposed on the exhaust path from the air outlet 64 of the portable information apparatus 12. In this manner, air can be supplied to the radiator 46 in the cooling device 11 to cool the radiator 46 by using the air supply fan 32 mounted in the portable information apparatus 12. Thus, an air supply fan for supplying air to the radiator 46 does not need to be provided in the cooling device 11. As a result, it is possible to reduce the sizes and costs of the cooling device 11 and the electronic apparatus 10 including the cooling device 11, while maintaining sufficient cooling performance for cooling the portable information apparatus 12. In particular, although the air supply fan 32 is preferably provided in consideration of use of the portable information apparatus 12 alone, since the cooling device 11 needs to have extension functions such as a computing function and a power supply function as well as an enhanced cooling function for cooling the portable information apparatus 12, elimination of an air supply fan for reducing the number of parts is advantageous.

In the electronic apparatus 10, a gap G is formed between the air outlet 64 and the radiator 46 (air inlet 54) while the portable information apparatus 12 is connected to the cooling device 11. In this manner, air that has been supplied from the air supply fan 32 and released from the air outlet 64 through the radiator fins 38 is mixed with outdoor air and cooled while passing through the gap G, and is introduced into the air inlet 54. Consequently, exhaust air that has passed through the radiator fins 38 to have an increased temperature is cooled in the gap G and then supplied to the radiator 46. Thus, cooling efficiency of the radiator 46 can be enhanced. Experiments with the electronic apparatus 10 showed that although varying depending on an ambient temperature, the temperature of air decreased by about 5° C. at each 1 cm of width of the gap G (i.e., distance between the air outlet 64 and the air inlet 54). Thus, exhaust air at a temperature of 50° C. to 55° C. at the air outlet 64 under a room temperature of 28° C. was cooled while passing through the gap G having a width of about 2 cm, and introduced to the air inlet 54 at a temperature of 40° C. to 45° C. Thus, the radiator 46 in which cooling water at a temperature of 50° C. to 55° C. circulates was sufficiently cooled.

In this case, the cooling unit 45 of the cooling device 11 is a water cooling unit in which the radiator 46, the water cooling jacket 50, and the circulating pump 51 are connected to one another in a loop by the pipes 52 so that cooling water circulates, and uses the water cooling jacket 50 as the heat-receiving heat sink 26. Thus, the cooling device 11 can efficiently cool the portable information apparatus 12.

In the electronic apparatus 10, the heat-dissipation heat sink 27 is located closer to the heating body 60 than the radiator fins 38 are (see FIGS. 6 and 7). Specifically, the heat-dissipation heat sink 27 is disposed immediately under the heating body 60, and the radiator fins 38 are separated from the heat-dissipation heat sink 27 with the heat pipe 62 interposed therebetween. This configuration enables a large part of heat generated in the heating body 60 to be transferred from the heat-dissipation heat sink 27 to the heat-receiving heat sink 26 in the water cooling unit 45 having a larger heat dissipation capacity than that of the radiator fins 38, thereby enhancing cooling efficiency of the heating body 60. In addition, with a reduction of the amount of heat transfer to the radiator fins 38, the temperature of exhaust air from the air outlet 64 decreases, and thus, cooling efficiency of the radiator 46 is enhanced.

Figure 8:
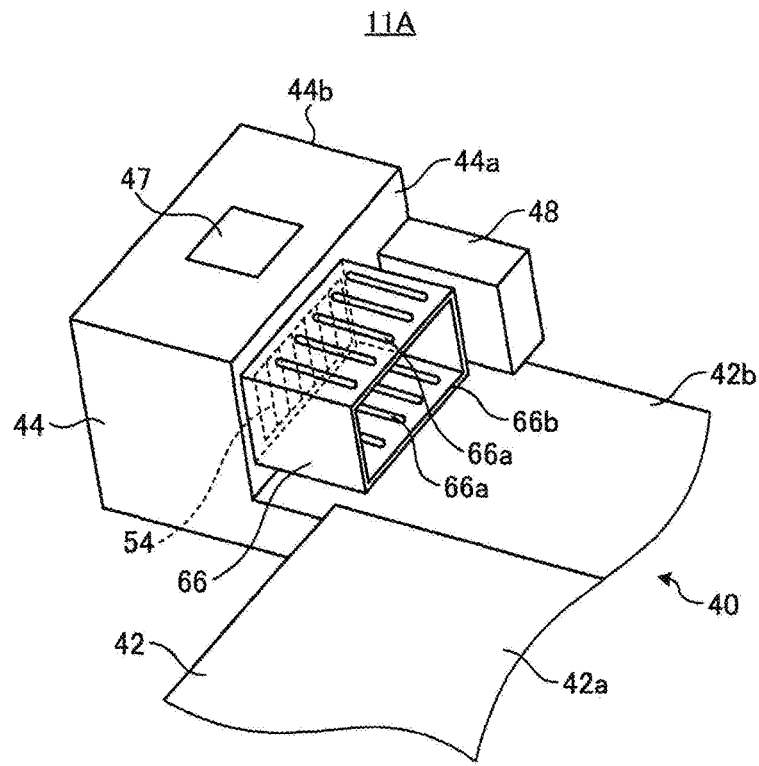
FIG. 8 is a perspective view illustrating a portion near a radiator housing of a cooling device according to a variation.
Figure 9:
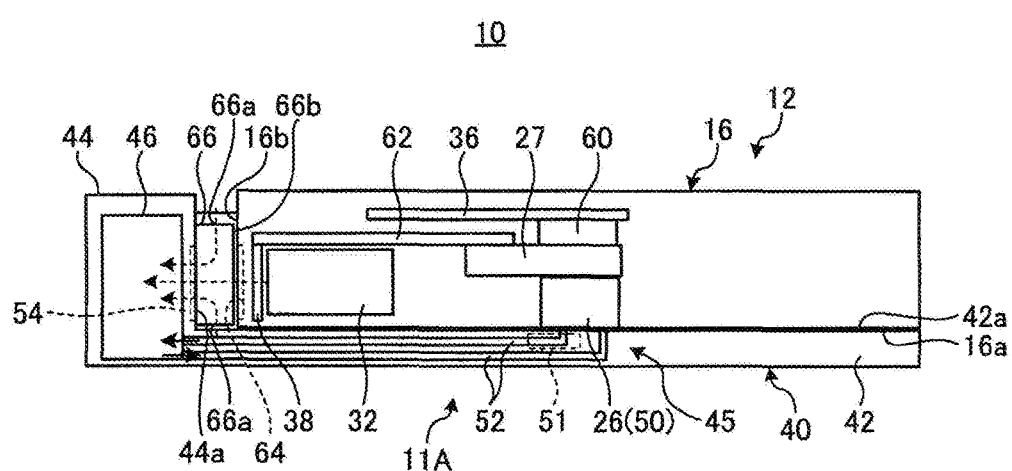
FIG. 9 is a side view illustrating a state in which the cooling device illustrated in FIG. 8 is connected to the portable information apparatus.

FIG. 8 is a perspective view of a portion near a radiator housing 44 of a cooling device 11A according to a variation. FIG. 9 is a side view of a state in which the cooling device 11A illustrated in FIG. 8 is connected to the portable information apparatus 12.

As illustrated in FIGS. 8-9, in the cooling device 11A, a rectangular cylindrical duct member 66 is provided on a side surface (outer wall surface) 44a of the radiator housing 44. The duct member 66 surrounds the air inlet 54 formed in the side surface 44a and projects from the side surface 44a. A plurality of slit holes 66a are formed in upper and lower outer wall surfaces of the duct member 66.

The duct member 66 is opposed to the air outlet 64 in such a manner that a front opening 66b of the duct member 66 surrounds at least a part of the air outlet 64 of the portable information apparatus 12 while the portable information apparatus 12 is connected to the cooling device 11A. In this manner, exhaust air from the air outlet 64 flows into the duct member 66 through the opening 66b and is introduced into the air inlet 54. Consequently, exhaust air from the air outlet 64 can be more smoothly supplied to the radiator 46 without fail, thereby enhancing cooling efficiency of the radiator 46. In addition, since the duct member 66 has the holes 66a, outdoor air is forcedly sucked from the holes 66a into the duct member 66 that is caused to be at a negative pressure by passage of exhaust air. Accordingly, air passing through the duct member 66 can be cooled, thereby further enhancing cooling efficiency of the radiator 46.

The present invention is not limited to the embodiment described above, and can be, of course, freely changed without departing from the gist of the invention.

In the example of the embodiment described above, the air outlet 64 is provided in the side surface 16b of the portable information apparatus 12. Alternatively, the air outlet 64 may be provided in another side surface or the bottom surface of the portable information apparatus 12. Similarly, the radiator 46 may be provided on another surface or the top surface (mount surface 42a) of the device chassis 40 as long as the radiator 46 is disposed on the exhaust path from the air outlet 64 in the portable information apparatus 12.

In the example of the embodiment described above, the cooling device 11 includes the cooling unit 45. Alternatively, the cooling unit 45 may be replaced by an air cooling unit.

As has been described, the present invention provides a portable information apparatus having a cooling device for cooling the portable information apparatus.

While the invention has been particularly shown and described with reference to a preferred embodiment, it will be understood by those skilled in the art that various changes in form and detail may be made therein without departing from the spirit and scope of the invention.

What is claimed is:
1. A docking apparatus comprising:
a chassis having an upward-facing surface to be contacted with a bottom surface of a portable information apparatus having
a heating body;
a heat-dissipation heat sink thermally connected to said heating body;
an air supply fan;
an air outlet located at a side surface orthogonal to said bottom surface of said portable information apparatus;
a heat transfer member thermally connected to said heat-dissipation heat sink; and
a radiator fin thermally connected to said heat transfer member, wherein said radiator fin is disposed between said air supply fan and said air outlet;
a cooling unit, located on said chassis, includes
a heat-receiving heat sink, located on said upward-facing surface of said chassis, to be contacted with said heat-dissipation heat sink when said portable information apparatus is detachably connected to said chassis;
a radiator; and
a plurality of pipes connecting said heat-receiving heat sink to said radiator for dissipating heat absorbed by said heat-receiving heat sink to said radiator; and
a duct member, located on said chassis, to be connected between said air outlet of said portable information apparatus and said radiator of said cooling unit in order to direct heat from said radiator fin of said portable information apparatus to said radiator of said cooling unit of said cooling unit.

2. The docking apparatus of claim 1, wherein said plurality of pipes contain water inside.

3. The docking apparatus of claim 2, wherein said cooling unit includes a circulating pump.

4. The docking apparatus of claim 3, wherein said radiator and said circulating pump are connected to one another in a loop by said plurality of pipes in order for said water to circulate.

5. The docking apparatus of claim 4, wherein said heat-receiving heat sink includes a water cooling jacket.

* * * * *